May 23, 1933.  C. SULLIVAN  1,910,863
FISHING POOL GAME
Filed April 30, 1930
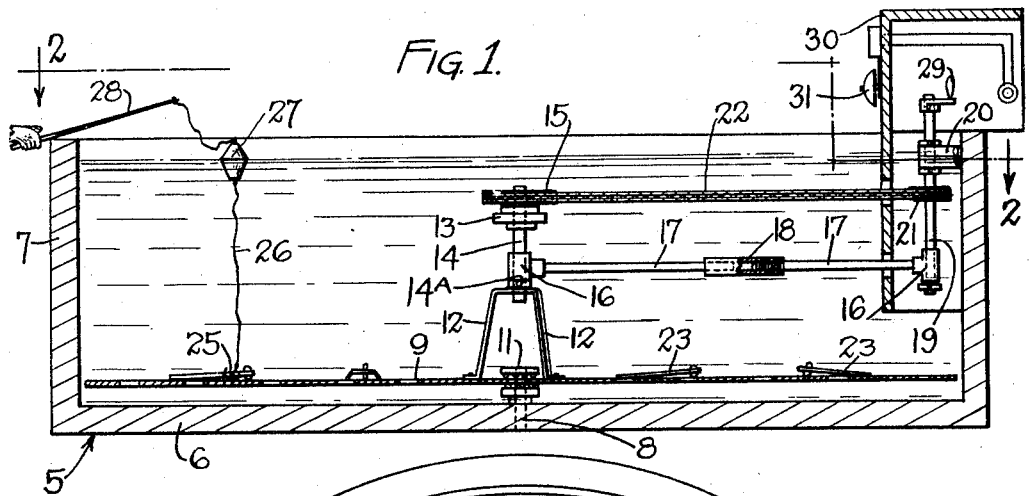
Fig. 1.
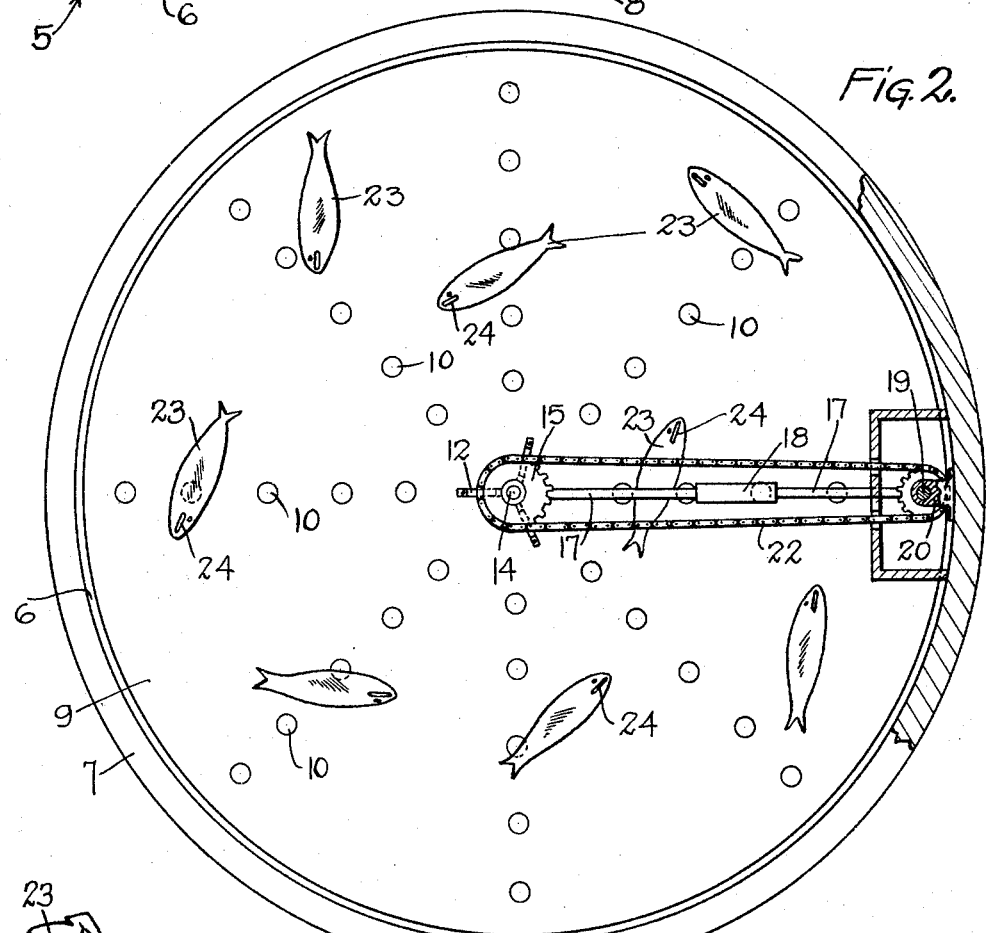
Fig. 2.
Fig. 3.
Inventor
CONELIOUS SULLIVAN
By His Attorney Patented May 23, 1933

1,910,863

UNITED STATES PATENT OFFICE

CONELIOUS SULLIVAN, OF BROOKLYN, NEW YORK

FISHING POOL GAME

Application filed April 30, 1930. Serial No. 448,682.

This invention relates to games and in particular to one making use of a fishing pool in which objects simulating fish are employed which move and which they, by chance, become engaged on a hook so that the person playing, through skillful manipulation, may catch the fish after getting a "bite".

A particular object of my invention is to provide, in a device of the character referred to, a movable bottom having openings therein, which bottom is arranged for the support of the fish and the openings in which permit currents of water to come up therethrough to disturb the relation of the fish so that, to the observer, they will be life-like.

An equally important object of my invention is the provision of means for mounting within the fishing pool, a revolvable bottom which is manipulated from one side of the pool by an attendant and which will cause various current-like flowing movements of the water to impart a movement to the fish.

A still further object of my invention is the provision of flat, metallic game pieces cut out in the shape of fish and having at their nose ends, staples or eyes through the medium of which they may be hooked by a player making use of a fishing pole and line.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing:

Figure 1 is a view in sectional elevation of a fishing pool game constructed in accordance with my invention.

Figure 2 is a top plan view taken on the line 2—2 of Figure 1, and

Figure 3 is a fragmentary view in perspective of the nose end of a fish game piece showing the relative position of the staples or eyes used in hooking the fish during the game.

Referring to the drawing in detail, 5 indicates generally a fishing pool consisting of a bottom 6 and peripheral wall 7, it being preferable that the pool be circular in shape in order to accommodate a maximum number of players. The bottom 6 at its center is provided with a spindle 8 upon which is rotatably mounted the bottom disk 9 which may be made of metal, of a non-corrodible nature or wood and may be painted to blend with the color of the water so that it will not be apparent to the eye of the observer. This bottom 9 is provided with a series of small openings 10 and it is mounted for revolvable rotation between suitable anti-friction bearings 11.

Mounted upon the bottom disk or turntable, is the tripod support 12 consisting of the usual three legs arranged to support a bearing 13 at their upper ends in which is journalled a stub shaft 14 which carries at its upper end, a sprocket wheel 15. The lower end of the shaft 14 is engaged by a suitable T-piece 16 to which is secured one rod 17 of a turn buckle combination which consists of the adjusting sleeve 18 and at its opposite side, an additional rod 17 and T 16. The T at the opposite side is arranged to fit about the lower end of a drive shaft 19 which is journalled in a suitable bearing 20 secured in any suitable manner to the side wall 7 of the pool.

This shaft 19 has secured thereto, the sprocket pinion 21 and this sprocket pinion and the sprocket wheel 15 are connected through the medium of a suitable sprocket chain 22 through which drive is transferred from the shaft 19 to the shaft 14, the latter of which being secured to the tripod bearing 13 revolves therewith and the shaft 14 in turn, being secured to the tripod collar 14-A, causes the legs 12 to revolve and with them, the turntable 9.

As has been before mentioned, the bottom 9 is provided with openings and when a fish 23 is disposed over one of the openings, an upward current of water will dislodge the fish or turn it over or impart thereto, a movement and the mass of water in the pool revolving, will therefore impart to the imitation fish, a life-like movement.

The fish are made preferably of flat stock and are indicated by the numeral 23. The fish are provided adjacent their nose ends, with the oppositely disposed staples or eyes 24 which serve to keep the nose end of the fish in spaced relation with the bottom 9 and also provide means for engaging in the hook 25 used on the end of the fishing line 26 in which line is incorporated a float 27. The fish line 26 is connected with a suitable pole 28 and the hook 25 is provided with three prongs, preferably, one of which will engage in the staple or eye 24 of the fish.

The upper end of the shaft 19 carries a suitable handle 29 through the medium of which the shaft is revolved and the drive shaft and its associated parts is covered by a suitable housing 30 into which the operator's arm may be placed to operate the handle 29 and otherwise control the game without his motion being apparent to the players. The housing 30 is also provided with a suitable bell 31 and during the progress of the game, the bell will be rung until one of the players brings to the surface three of the fish.

The game is one in which considerable skill must be exercised in order that when a "bite" is had and the float 27 is submerged, indicating a "bite", that the fish will be properly hooked, that is, a quick jerk on the line would probably dislodge the hook with the result that the fish would be lost, the game closely simulating the actual catching of fish.

It is evident, therefore, that I have provided a fishing pool game which requires skill on the part of the player and which, having a movable bottom which is not apparent to the player, sets up currents of water which carry the fish around, as though they were swimming, the upward current, caused by the openings 10 in the bottom 9, having a tendency to slightly revolve the fish or elevate them from the bottom when they come to rest thereon over one of the openings 10. The purpose of the connecting rod 17 and turn buckle 18 is to take up the slack in the sprocket chain 22 which extends between the sprocket wheel 15 and sprocket pinion 21. The amount of the adjustment which would be slight, is taken up by the flexibility of the tripod legs 12.

While I have illustrated and described my invention with some degree of particularity, I realize that in practice various alterations therein may be made without departing from the spirit of the invention or the scope of the appended claims.

What I claim is:

1. A fishing pool game comprising a tank, a revolvable disk in the tank spaced from the bottom thereof and having numerous current openings throughout the area thereof, and means for revolving the disk.

2. A fishing pool game comprising a tank, a revolvable disk in the tank having current creating openings therein, means for revolving said disk, and a protective housing for a portion of said revolving means.

3. A fishing pool game comprising in combination, a tank, a revolvable disk spaced from the bottom of the tank and having numerous openings throughout the area thereof to provide currents, flat pieces made up in simulation of fish arranged to rest on said disk and be momentarily dislodged by said currents, and eyes on the opposite sides of said pieces for engagement with a fish hook, and arranged to prevent adhesion of the fish to the disk.

In testimony whereof, I, CONELIOUS SULLIVAN, have signed my name to this specification, this 25th day of April, 1930.

CONELIOUS SULLIVAN.